United States Patent [19]

Hayes

[11] Patent Number: 4,705,540
[45] Date of Patent: Nov. 10, 1987

[54] POLYIMIDE GAS SEPARATION MEMBRANES

[75] Inventor: Richard A. Hayes, Hockessin, Del.

[73] Assignee: E. I. Du Pont de Nemours and Company, Wilmington, Del.

[21] Appl. No.: 853,341

[22] Filed: Apr. 17, 1986

[51] Int. Cl.⁴ ............................................. B01D 53/22
[52] U.S. Cl. .......................................... 55/16; 55/68; 55/158
[58] Field of Search ............................ 55/16, 68, 158; 528/342, 348

[56] References Cited

U.S. PATENT DOCUMENTS

| | | | |
|---|---|---|---|
| Re. 30,351 | 7/1980 | Hoehn et al. | 55/16 |
| 3,410,826 | 11/1968 | Endrey | 528/191 X |
| 3,714,131 | 1/1973 | Hoback et al. | 528/342 |
| 3,745,149 | 7/1973 | Serafini et al. | 528/342 X |
| 3,822,202 | 7/1974 | Hoehn et al. | 210/23 |
| 3,835,207 | 9/1974 | Frost et al. | 528/348 X |
| 3,899,309 | 8/1975 | Hoehn et al. | 29/16 |
| 4,113,628 | 9/1978 | Alegranti | 210/500 M |
| 4,378,324 | 3/1983 | Makino et al. | 264/41 |
| 4,378,400 | 3/1983 | Makino et al. | 428/220 |
| 4,440,643 | 4/1984 | Makino et al. | 210/500.2 |
| 4,474,662 | 10/1984 | Makino et al. | 210/500.2 |
| 4,474,858 | 10/1984 | Makino et al. | 428/473.5 |
| 4,485,056 | 11/1984 | Makino et al. | 264/41 |
| 4,486,376 | 12/1984 | Makino et al. | 264/342 R |
| 4,512,893 | 4/1985 | Makino et al. | 210/500.2 |
| 4,528,004 | 7/1985 | Makino et al. | 55/158 |
| 4,560,742 | 12/1985 | Pater | 528/342 |
| 4,603,193 | 7/1986 | Richardson et al. | 528/342 |

FOREIGN PATENT DOCUMENTS

| | | | |
|---|---|---|---|
| 113574 | 7/1984 | European Pat. Off. | 55/158 |
| 0132221 | 1/1985 | European Pat. Off. | |
| 0141781 | 5/1985 | European Pat. Off. | |
| 177303 | 11/1982 | Japan | 210/500.39 |
| 5344 | 1/1983 | Japan | 55/158 |
| 8512 | 1/1983 | Japan | 55/158 |
| 82103 | 5/1985 | Japan | 55/158 |
| 257805 | 12/1985 | Japan | 55/158 |
| 2098994 | 12/1982 | United Kingdom | |
| 2101137 | 1/1983 | United Kingdom | |
| 2102333 | 2/1983 | United Kingdom | |

Primary Examiner—Robert Spitzer

[57] ABSTRACT

A highly permeable aromatic polyimide gas separation membrane and the process of using it are disclosed. The aromatic polyimide has the formula

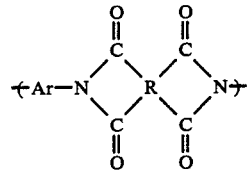

wherein —Ar— is

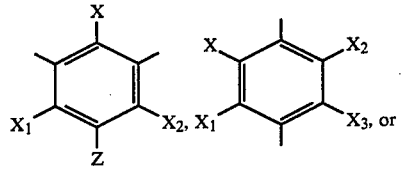

or mixtures thereof, —X, —X₁, —X₂ and —X₃ independently are alkyl groups having 1 to 6 carbon atoms or aromatic groups having 6 to 13 carbon atoms, and —Z is —H, —X, —X₁, —X₂, or —X₃; and R is

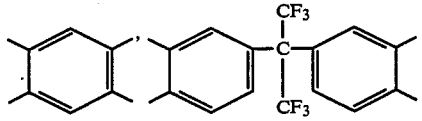

or mixtures thereof.

6 Claims, No Drawings

POLYIMIDE GAS SEPARATION MEMBRANES

BACKGROUND OF THE INVENTION

1. Field of the Invention

The present invention relates to certain substituted aromatic polyimide gas separation membranes and the process of using them.

2. Prior Art

U.S. Pat. No. 3,822,202 and U.S. Pat. No. 3,899,309 disclose aromatic polyimide gas separation membranes in which the molecular structure is such that the molecules in the polymer are unable to pack densely, and, therefore, have high gas permeation rates.

U.S. Pat. No. 4,113,628 and U.K. No. 1,435,151 disclose aromatic polyimide gas separation membranes prepared from polyamide acid membranes.

EPO No. 132,221 and EPO No. 141,781 disclose substituted aromatic polyimides and photochemically crosslinked compositions thereof, but not for use as gas separation membranes.

U.S. Pat. Nos. 4,370,290, 4,460,526, 4,474,662, 4,512,893, U.K. No. 2,098,994, U.K. No. 2,101,137, and U.K No. 2,102,333 disclose microporous aromatic polyimide membranes and the process from which they are prepared.

U.S. Pat. No. 4,486,376 and U.K. No. 2,104,832 disclose gas separation membranes made from a microporous aromatic polyimide support treated with modifying agents.

U.S. Pat. Nos. 4,378,324, 4,440,643, 4,474,858, 4,485,056, 4,528,004, U.K No. 2,102,726, U.K. No. 2,104,411, and U.K. No. 2,104,905 disclose gas separation membranes made from a microporous aromatic polyimide support coated with an aromatic polyamide acid or aromatic polyimide.

U.S. Pat. No. 4,378,400 and EPO No. 43,265 disclose aromatic polyimide gas separation membranes in which the molecular structure is such that the molecules in the polymer can pack densely.

EPO No. 113,574 discloses gas separation membranes made from aromatic polyetherimides.

EPO No. 143,552 discloses gas separation membranes made from a microporous aromatic polyimide support coated with a crosslinked silicone resin film.

EPO No. 125,908 discloses aromatic polyimide reverse osmosis membranes.

SUMMARY OF THE INVENTION

The present invention relates to aromatic polyimide gas separation membranes in which the diamines are rigid and are substituted on essentially all of the positions ortho to the amino substituents and the acid anhydride groups are essentially all attached to rigid aromatic moieties. The membranes exhibit very high permeation to gases while still being able to effectively separate several combinations of gases.

DETAILED DESCRIPTION

The present invention relates to the discovery that aromatic polyimides prepared by polycondensation of dianhydrides with phenylene diamines having substituents on all positions ortho to the amine functions form membranes with exceptional gas permeability. The gas permeability increases substantially if structurally rigid dianhydrides are used in combination with the substituted diamines. These increases in productivity of these membranes is believed to be due to the high molecular free volume in the polymer structure resulting from the rigid nature of the rotationally hindered polymer chains.

Generally, extremely high gas permeation through dense polymeric membranes is found only with low glass transition temperature (Tg) materials, such as silicone rubbers and many polyolefin polymers. The low Tg materials are generally only useful as the dense separating layer in composite membranes, where a supporting porous membrane substructure provides structural integrity.

High Tg polymeric materials, found in the prior art, do not possess extremely high gas permeabilities. Examples reported involve mostly unsubstituted, or partially substituted, polymers subject to forming close chain packing during fabrication and/or subsequent operation.

The present invention circumvents the above shortcomings and provides exceptionally high permeability dense membranes using high Tg aromatic polyimides containing the repeating unit:

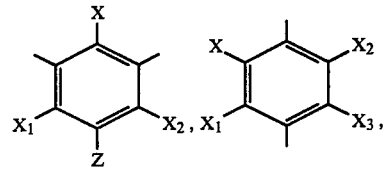

where
—Ar— is

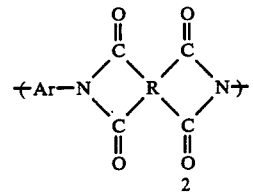

or mixture thereof,
R is

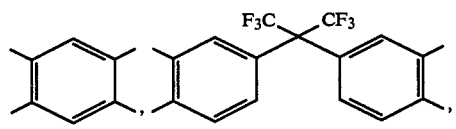

or mixture thereof
—X, —X$_1$, —X$_2$, and —X$_3$ are independently alkyl groups having 1 to 6 carbon atoms preferably methyl or ethyl, or aromatic groups of 6 to 13 carbon atoms, and —Z is —H, —X, —X$_1$, —X$_2$, or —X$_3$.

The multiple substitutions ortho to the amines in the above illustrated structures sterically restricts free rotation around the imide linkage. In addition, the dianhydrides used in this invention are structurally rigid. This causes the chains in the polyimides of this invention to be extremely rigid. The greatly enhanced permeability observed in these membranes may be attributed to the rigid nature of the polyimide. The ability of these membranes to effect useful gas separations from ulticomponent mixtures may be due to the highly rigid nature of these polyimides allowing the optimum molecular free volume in the polymer.

The gas permeabilities of non-rigid polymers, such as polyether sulfones, polyphenylene oxides, polyamides and polyimides, reported before are generally ordered: $H_2 > He > CO_2 > O_2 > CH_4 \geq N_2$. The rigid polyimides reported in this patent have the gas permeabilities order: $CO_2 > He \geq H_2 > O_2 > N_2 \geq CH_4$. This is similar to the order found for other ultra high permeability polymers, such as the silicone rubbers.

As preferred examples, some of the fully cyclized polyimides of this invention are soluble in ordinary organic solvents. This is a great advantage for the ease of fabrication of industrially useful membranes. The polyimides reported in this invention range from soluble to solvent resistant and can be fabricated into membranes using known techniques. For example, the soluble polyimides can be solution cast on porous solvent resistant substrates to serve as the dense separating layer of a composite membrane. The soluble examples can be solution cast as dense or asymmetric films. Insoluble examples can be cast into membranes from their polyamic acid form, followed by chemical or thermal cyclization.

The polyimides described in this invention have high inherent thermal stabilities. They are stable to 400° C. in air or inert atmospheres. The glass transition temperatures of these polyimides are generally above 300° C. The high temperature characteristics of these polyimides can help to prevent the membrane compaction problems observed in other polymers to even moderate temperatures.

The membranes of the present invention are generally useful in separating mixtures of gases. Specific examples of such separations include recovery of hydrogen in oil refineries and in ammonia plants, separation of carbon monoxide and hydrogen in syngas systems, separation of carbon dioxide or hydrogen sulfide from hydrocarbons, and enrichment of oxygen and nitrogen from air for increased combustion or inerting streams, respectively.

EXAMPLES

Example 1

Dimethylsulfoxide (500 ml) was added to 4,4'-(hexafluoroisopropylidene)-bis(phthalic anhydride) (6F, 88.87 g, 0.20 mol) and 2,4,5-trimethyl-1,3-phenylene diamine (DAM, 30.01 g, 0.20 mol) at 50° C. in an inert atmosphere with stirring. After stirring at 50° C. for 2 hours, a mixture of acetic anhydride (75.8 ml, 0.8032 mol) and triethylamine (112.94 ml, 0.8104 mol) were added and the reaction allowed to stir for an additional 2 hours at 50° C. under an inert atmosphere. The viscous reaction solution was precipitated in methanol, and the white solid was filtered and dried in a vacuum oven overnight at room temperature, at 110° C. for 2 hours, and at 220° C. for 5 hours. This gave 108.8 g of off-white polyimide. This polyimide is soluble at greater than 20% solids (based on polymer weight) in acetone, dichloromethane, N-methyl pyrrolidone, m-cresol, and dimethyl acetamide.

Example 2

Films of the polyimide prepared in Example 1 were cast from a 10% polymer solution based on weight in N-methyl pyrrolidone onto a glass plate treated with Du Pont TEFLON ® dry lubricant at 80° C. with a 15-mil ($38 \times 10^5$ m) knife gap. The films were dried on the plate at room temperature, stripped off the plate and dried at room temperature overnight in a vacuum oven, and then at 200° C. for 6 hours in a vacuum oven. The films were then tested for mixed gas $CO_2$/methane (50/50 mole ratio) permeabilities at 240 psig ($16.5 \times 10^5$ Pa), 25° C. The results are reported below:

$CO_2$ Productivity: 72,636 centiBarrer
$CH_4$ Productivity: 3,792 centiBarrer
$CO_2/CH_4$ Selectivity: 19.1
and
$CO_2$ Productivity: 71,435 centiBarrer
$CH_4$ Productivity: 3,776 centiBarrer
$CO_2/CH_4$ Selectivity: 18.9

Du Pont TEFLON ® dry lubricant contains a fluorocarbon telomer which reduces the adhesion of the membrane to the glass plate.

$$\text{centiBarrer} = 10^{-12} \times \frac{cm^3 \text{ (STP)} \cdot cm}{cm^2 \cdot sec \cdot (cmHg)}$$

Example 3

Films of the polyimide prepared in Example 1 were cast from 15% polymer solution (based on weight) in N-methyl pyrrolidone onto a glass plate treated with Du Pont TEFLON ® dry lubricant at 100° C. with a 15 mil ($38 \times 10^5$ m) knife gap. The films were dried on the plate at 100° C. for 15 minutes, cooled, stripped off the plate and dried at 100° C. overnight in a vacuum oven. The films were then tested for mixed gas $CO_2$/methane (50/50 mole ratio) permeabilities at 240 psig ($16.5 \times 10^5$ Pa), 25° C. The results are reported below:

$CO_2$ Productivity: 40,888 centiBarrer
$CH_4$ Productivity: 2,013 centiBarrer
$CO_2/CH_4$ Selectivity: 20.3
and
$CO_2$ Productivity: 38,583 centiBarrer
$CH_4$ Productivity: 2,167 centiBarrer
$CO_2/CH_4$ Selectivity: 17.8

The films prepared above were extracted in MeOH:$H_2O$ (50:50) for 3 days, and twice in MeOH for 3 hours each. These films were dried in a vacuum oven overnight at room temperature, and at 100° C. in a vacuum oven for 24 hours. The films were then tested for mixed gas $CO_2$/methane (50/50 mole ratio) permeabilities at 400 psig ($27.6 \times 10^5$ Pa), 35° C. The results are reported below:

$CO_2$ Productivity: 69,080 centiBarrer
$CH_4$ Productivity: 4,881 centiBarrer
$CO_2/CH_4$ Selectivity: 14.2

The extracted films prepared above were tested for mixed gas $CO_2$/methane (50/50 mole ratio) permeabilities at 400 psig ($27.6 \times 10^5$ Pa), 90° C. The results after 48 hours of testing are reported below:

$CO_2$ Productivity: 57,105 centiBarrer
$CO_2/CH_4$ Selectivity: 8.0

The extracted films prepared above were tested for mixed gas hydrogen/methane (50/50 mole ratio) permeabilities of 400 psig ($27.6 \times 10^5$ Pa), 35° C. The results are reported below:

$H_2$ Productivity: 43,340 centiBarrer
$CH_4$ Selectivity: 3,570 centiBarrer
$H_2/CH_4$ Selectivity: 12.1

Example 4

Films of the polyimide prepared in Example 1 were cast from a 15% polymer solution (based on weight) in N-methyl pyrrolidone onto a glass plate treated with Du Pont TEFLON ® dry lubricant at 80° C. with a 15 mil (3.8×10⁻⁵ m) knife gap. The films were dried on the plate at 80° C. for 25 minutes, cooled to room temperature, stripped off the plate and, dried at room temperature overnight in a vacuum oven, and at 120° C. for 4 hours in a vacuum oven. The films were then tested for mixed gas $O_2/N_2$ (21/79 mole ratio) permeabilities at 300 psig (20.7×10⁵ Pa), 25° C. The results are reported below:
$O_2$ Productivity: 13,000 centiBarrer
$O_2/N_2$ Selectivity: 3.0

The films prepared above were heat treated in a vacuum oven at 250° C. for 4 hours. The films were then tested for mixed gas $O_2/N_2$ (21/79 mole ratio) permeabilities at 300 psig (20.7×10⁵ Pa), 25° C. The results are reported below:
$O_2$ Productivity: 9,300 centiBarrer
$O_2/N_2$ Productivity: 3.2

Example 5

Films of the polyimide prepared in Example 1 were cast from a 10% polymer solution (based on weight) in N-methyl pyrrolidone onto a glass plate treated with Du Pont TEFLON ® dry lubricant at 100° C. with a 10-mil (2.54×10⁻⁴ m) knife gap. A slanted glass dust cover was placed over the film and the film dried on the plate at 100° C. for 10 minutes and then at 80° C. in a vacuum oven overnight. The films were cooled to room temperature, stripped off the plate and tested for mixed gas $O_2/N_2$ (21/79 mole ratio) permeabilities at 300 psig (20.7×10⁵ Pa), 25° C. The results are reported below:
$O_2$ Productivity: 12,000 centiBarrer
$O_2/N_2$ Selectivity: 3.6

Example 6

N,N-Dimethylacetamide (750 ml) was added to a mixture of 1,2,4,5-benzene tetracarboxylic dianhydride (PMDA, 65.44 g, 0.30 mol) and 2,4,6-trimethyl-1,3-phenylene diamine (DAM, 45.07 g, 0.30 mol) at 50° C. in an inert atmosphere with stirring. After stirring at 50° C. for 1 hour, a solution of acetic anhydride (113.7 ml, 1.21 mol) and triethylamine (169.41 ml, 1.22 mol) was added to the light golden viscous solution with stirring. A bright yellow solid came out of solution and slowly redissolved to form a dark brown viscous solution. The reaction solution was allowed to stir at 50° C. in an inert atmosphere for 3 hours, and was then precipitated in methanol. The light solid was collected by filtration, dried overnight at room temperature in a vacuum oven, and then dried at 200° C. in a vacuum oven for 5 hours to give 98.5 g product. This polyimide is soluble at 10% solids (based on weight) in N-methyl pyrrolidone.

Example 7

Films of the polyimide prepared in Example 6 were cast from a 10% polymer solution (based on weight) in N-methyl pyrrolidone onto a glass plate treated with Du Pont TEFLON ® dry lubricant at 80° C. with a 15 mil (3.8×10⁻⁵ m) knife gap. The films were dried on the plate at ambient temperature, stripped off the plate, and dried at room temperature in a vacuum oven overnight, and then at 200° C. for 6 hours in a vacuum oven. The films were then tested for mixed gas $CO_2$/methane (50/50 mole ratio) permeabilities at 245 psig (17×10⁵ Pa), 25° C. The results for a film 1 mil thick are reported below:
$CO_2$ Productivity: 62,285 centiBarrer
$CH_4$ Productivity: 3,418 centiBarrer
$CO_2/CH_4$ Selectivity: 18.2

Example 8

Films of the polyimide prepared in Example 6 were cast from a 10% polymer solution (based on weight) in N-methyl pyrrolidone onto a glass plate treated with Du Pont TEFLON ® dry lubricant at 100° C. with a 15 mil (3.8×10⁻⁵ m) knife gap. The films were dried on the plate at 100° C. for 15 minutes, cooled to room temperature, stripped off the plate and dried at 100° C. overnight in a vacuum oven. The films were then tested for mixed gas $CO_2$/methane (50/50 mole ratio) permeabilities at 235 psig (16.2×10⁵ Pa), 25° C. The results are reported below:
$CO_2$ Productivity: 13,141 centiBarrer
$CH_4$ Productivity: 631 centiBarrer
$CO_2/CH_4$ Selectivity: 20.8

Example 9

Films of the polyimide prepared in Example 6 were cast from a 10% polymer solution (based on weight) in N-methyl pyrrolidone onto a glass plate treated with Du Pont TEFLON ® dry lubricant at 80° C. with a 15-mil (3.8×10⁻⁵ m) knife gap. The films were dried on the plate at 80° C. for 30 minutes, cooled to room temperature, stripped off the plate, and dried at room temperature overnight in a vacuum oven and at 120° C. for 4 hours in a vacuum oven. The films were then tested for mixed gas $O_2/N_2$ (21/79 mole ratio) permeabilities at 300 psig (20.7×10⁵ Pa), 25° C. The results are reported below:
$O_2$ Productivity: 4,300 centiBarrer
$O_2/N_2$ Selectivity: 3.2

Example 10

Films of the polyimide prepared in Example 6 were cast from a 10% polymer solution (based on weight) in N-methyl pyrrolidone onto a glass plate treated with Du Pont TEFLON ® dry lubricant at 50° C. with a 12-mil (3.0×10⁻⁵ m) knife gap. A slanted glass dust cover was placed over the film and the film dried on the plate at 50° C. for 40 minutes, and then at 80° C. in a vacuum oven overnight. The films were cooled to room temperature, stripped off the plate and tested for mixed gas $O_2/N_2$ (21/79) (mole ratio) permeabilities at 300 psig (20.7×10⁵ Pa), 25° C. The results are reported below:
$O_2$ Productivity: 8,100 centiBarrer
$O_2/N_2$ Selectivity: 3.6

Example 11

To a solution of 1,2,4,5-benzenetetracarboxylic dianhydride (PMDA, 58.89 g, 0.27 mol) and 4,4'-(hexafluoroisopropylidene)-bis(phthalic anhydride) (6F, 13.32 g, 0.03 mol) in N,N-dimethylacetamide (500 ml) was added with stirring at 50° C. in an inert atmosphere a solution of 2,4,6-trimethyl-1,3-phenylene diamine (DAM, 45.07 g, 0.30 mol) in N,N-dimethylacetamide (250 ml). The resulting golden viscous solution was stirred at 50° C. for 2 hours and then a solution of acetic anhydride (113.7 ml, 1.21 mol) and triethylamine (169.41 ml, 1.215 mol) was added with stirring. A bright yellow solid formed and slowly went back into solution to form a clear copper colored viscous liquid. After stirring for 2 hours at 50° C., the reaction solution was precipitated in methanol, the resulting light solid collected by filtration and dried overnight at ambient temperature and then at 200° C. for 5 hours in a vacuum oven to give 105.3 g product.

Example 12

Films of the polyimide prepared in Example 11 were cast from a 15% polymer solution (based on weight) in N-methyl pyrrolidone onto a glass plate at 50° C. with a 15-mil ($3.8 \times 10^{-5}$ m) knife gap. After drying on the plate at 50° C. for 10 minutes, the films were stripped off the plate and dried in a vacuum oven overnight at 80° C. The films were tested for mixed gas $CO_2$/methane (50/50 mole ratio) permeabilities at 150 psig ($10.3 \times 10^5$ Pa), 25° C. The results are reported below:
$CO_2$ Productivity: 8,869 centiBarrer
$CO_2/CH_4$ Selectivity: 23

Films prepared as described above were then extracted overnight with running distilled water and dried in a vacuum oven at 80° C. The films were tested for mixed gas $CO_2$/methane (50/50 mole ratio) permeabilities at 150 psig ($10.3 \times 10^5$ Pa), 25° C. The results are reported below:
$CO_2$ Productivity: 41,275 centiBarrer
$CO_2/CH_4$ Selectivity: 20.5

Example 13

Films of the polyimide prepared in Example 11 were cast from a 15% polymer solution (based on weight) in N-methyl pyrrolidone onto a glass plate treated with Du Pont TEFLON ® dry lubricant at 100° C. with a 15 mil ($3.8 \times 10^{-5}$ m) knife gap. The films were dried on the plate at 100° C. for 15 minutes, cooled to room temperature, stripped off the plate and dried at 100° C. overnight in a vacuum oven. The films were then tested for mixed gas $CO_2$/methane (50/50 mole ratio) permeabilities at 245 psig ($16.9 \times 10^5$ Pa), 25° C. The results are reported below:
$CO_2$ Productivity: 12,469 centiBarrer
$CH_4$ Productivity: 796 centiBarrer
$CO_2/CH_4$ Selectivity: 15.6

Example 14

To a solution of 2,3,5,6-tetramethyl-1,4-phenylene diamine (16.43 g, 0.10 mol) in N-methyl pyrrolidone (250 ml) was portionwise added 4,4'-(hexafluoroisopropylidene)-bis(phthalic anhydride) (6F, 44.4 g, 0.10 mol, four portions, last portion washed in with 100 ml N-methyl pyrrolidone) under an inert atmosphere with stirring at room temperature. After the golden solution had stirred for three hours at room temperature, a solution of acetic anhydride (37.9 ml, 0.4016 mol) and triethylamine (56.47 ml, 0.4052 mol) was added with rapid stirring. The resultant orange solution was stirred at room temperature for two hours and then precipitated in methanol. The white solid was collected by filtration, air dried, and then dried in a vacuum oven at room temperature overnight, at 100° C. for 3 hours, and at 250° C. for 3 hours to give 54.2 g product.

Example 15

Films of the polyimide prepared in Example 14 were cast from a 15% polymer solution (based on weight) in N-methyl pyrrolidone onto a glass plate treated with Du Pont TEFLON ® dry lubricant at 75° C. with a 15-mil ($38.4 \times 10^{-5}$ m) knife gap. The films were dried on the plate at 75° C. for 25 minutes, cooled to room temperature, stripped off the plate and dried at room temperature overnight, and at 120° C. for 4 hours, and at 220° C. for 3 hours in a vacuum oven. The films were then tested for mixed gas $CO_2$/methane (50/50 mole ratio) permeabilities at 245 psig ($16.9 \times 10^5$ Pa), 25° C. The results are reported below:
$CO_2$ Productivity: 38,058 centiBarrer
$CH_4$ Productivity: 1,537 centiBarrer
$CO_2/CH_4$ Selectivity: 24.8

The films prepared above were tested for mixed gas $O_2/N_2$ (21/79 mole ratio) permeabilities at 300 psig ($20.7 \times 10^5$ Pa), 25° C. The results are reported below:
$O_2$ Productivity: 7,300 CentiBarrer
$O_2/N_2$ Selectivity: 3.2

The films prepared above were consecutively tested for pure gas helium, nitrogen, and carbon dioxide permeabilities at 400 psig ($27.6 \times 10^5$ Pa), 25° C. The results are reported below:
He Productivity: 53,000 centiBarrer
$N_2$ Productivity: 2,300 centiBarrer
$CO_2$ Productivity: 76,000 centiBarrer
$He/N_2$ Selectivity: 23
$CO_2/N_2$ Selectivity: 33

Example 16

To a solution of 2,3,5,6-tetramethyl-1,4-phenylene diamine (16.43 g, 0.10 mol) and 2,4,6-trimethyl-1,3-phenylene diamine (15.02 g, 0.10 mol) in N-methyl pyrrolidone (300 ml) was portionwise added 4,4'-(hexafluoroisopropylidene)-bis(phthalic anhydride) (6F, 88.8 g, 0.20 mol, added in 9 portions, last portion washed in with N-methyl pyrrolidone (166 ml) under an inert atmosphere with stirring at room temperature. The clear yellow solution was stirred at room temperature for 3 hours, becoming so viscous that additional N-methyl pyrrolidone (200 ml) was added. A solution of acetic anhydride (75.8 ml, 0.8032 mol) and triethylamine (112.94 ml, 0.8104 mol) was added with rapid stirring at room temperature. A white solid came out of solution, but slowly redissolved to form a viscous orange-yellow solution. After stirring for 2 hours at room temperature, the reaction solution was precipitated in methanol. The resulting off-white solid was collected, washed with additional methanol, air dried and dried in a vacuum oven at room temperature overnight, at 100° C. for 3 hours, and at 250° C. for 3 hours, to give 109.4 g product.

Example 17

Films of the polyimide prepared in Example 16 were cast from a 15% polymer solution (based on weight) in N-methyl pyrrolidone onto a glass plate treated with Du Pont TEFLON ® dry lubricant at 80° C. with a 15 mil ($3.8 \times 10^{-5}$) knife gap. The films were dried on a plate at 80° C. for 25 minutes, cooled to room temperature, stripped off the plate and dried in a vacuum oven at room temperature overnight and at 120° C. for 4 hours. The films were then tested for mixed gas $O_2/N_2$ (21/79 mole ratio) permeabilities at 300 psig ($20.7 \times 10^5$ Pa), 25° C. The results are reported below:
$O_2$ Productivity: 5,400 centiBarrer
$O_2/N_2$ Selectivity: 3.6

The films prepared above were tested for mixed gas $CO_2/CH_4$ (50:50 mole ratio) permeabilities at 240 psig ($16.5 \times 10^5$ Pa), 25° C. The results are reported below:
$CO_2$ Productivity: 32,000 centiBarrer
$CH_4$ Productivity: 1,300 centiBarrer
$CO_2/CH_4$ Selectivity: 24.4

Example 18

To a solution of 2,3,5,6-tetramethyl-1,4-phenylene diamine (8.21 g, 0.05 mol) and 2,4,6-trimethyl-1,3-phenylene diamine (7.51 g, 0.05 mol) in N-methyl pyrrolidone (300 ml) was added 1,2,4,5-benzenetetracarboxylic dianhydride (10.91 g, 0.05 mol, washed in with N-methyl pyrrolidone (50 ml)) under an inert atmosphere with stirring at room temperature. After this yellow solution had stirred for 30 minutes, 4,4'-(hexafluoroisopropylidene)-bis(phthalic anhydride) (22.2 g, 0.05 mol, added in 2 portions, last portion washed in with N-methyl pyrrolidone (100 ml)) was portionwise added at room temperature and the resulting yellow solution stirred for 3 hours. A solution of acetic anhydride (37.9 ml, 0.40 mol) and triethylamine (56.47 ml, 0.41 mol) was added with rapid stirring at room temperature. A white solid precipitated, but rapidly redissolved to form a gold solution. After stirring for 2 hours, the reaction solution was precipitated in methanol. The resulting off-white solid was collected by filtration, air dried, and dried in a vacuum oven at room temperature overnight, at 100° C. for 3 hours, and at 250° C. for 3 hours to give 44.0 g product.

Example 19

Films of the polyimide prepared in Example 18 were cast from a 15% polymer solution (based on weight) in N-methyl pyrrolidone onto a glass plate treated with Du Pont TEFLON ® dry lubricant at 80° C. with a 15-mil ($3.8 \times 10^{-5}$ m) knife gap. The films were dried on a plate at 80° C. for 30 minutes, cooled to room temperature, stripped off the plate and dried in a vacuum oven at room temperature overnight and at 120° C. for 5 hours. The films were then tested for mixed gas $O_2/N_2$ (21/79 mole ratio) permeabilities at 300 psig ($20.7 \times 10^5$ Pa), 25° C. The results are reported below:
$O_2$ Productivity: 4,900 centiBarrer
$O_2/N_2$ Selectivity: 3.5

The films prepared above were tested for mixed gas $CO_2/CH_4$ (50:50 mole ratio) permeabilities at 245 psig ($16.9 \times 10^5$ Pa), 25° C. The results are reported below:
$CO_2$ Productivity: 27,800 centiBarrer
$CH_4$ Productivity: 1,200 centiBarrer
$CO_2/CH_4$ Selectivity: 23.2

Example 20

To a solution of 2,4,6-trimethyl-1,3-phenylene diamine (30.01 g, 0.20 mol) in N-methyl pyrrolidone (500 ml) was added 1,2,4,5-benzenetetracarboxylic dianhydride (21.81 g, 0.10 mol) under an inert atmosphere with stirring at 50° C. After stirring for 30 minutes, 4,4'-(hexafluoroisopropylidene)-bis(phthalic anhydride) (44.4 g, 0.10 mol, added in 2 portions, last portion washed in with N-methyl pyrrolidone (250 ml)) was portionwise added with stirring at 50° C. The orange reaction solution was allowed to stir at 50° C. overnight. A solution of acetic anhydride (75.84 ml, 0.80 mol) and triethylamine (112.94 ml, 0.81 mol) was added with rapid stirring causing the reaction solution to turn brown. After stirring at 50° C. for 2 hours, the reaction solution was precipitated in methanol. The resulting off-white solid was collected by filtration, washed with methanol, air dried and dried in a vacuum oven at room temperature overnight, at 100° C. for 4 hours, and at 250° C. for 3 hours to give 86.8 g product.

Example 21

Films of the polyimide prepared in Example 20 were cast from a 15% polymer solution (based on weight) in N-methyl pyrrolidone onto a glass plate treated with Du Pont TEFLON ® dry lubricant at 80° C. with a 15 mil ($3.8 \times 10^{-5}$) knife gap. The films were dried on a plate at 80° C. for 25 minutes, stripped off the plate and dried in a vacuum oven at room temperature overnight and at 120° C. for 4 hours. The films were consecutively tested for pure gas helium, nitrogen, and carbon dioxide permeabilities at 400 psig ($2.7 \times 10^5$ Pa), 25° C. The results are reported below:
He Productivity: 44,000 centiBarrer
$N_2$ Productivity: 4,000 centiBarrer
$CO_2$ Productivity: 152,000 centiBarrer
$He/N_2$ Selectivity: 11
$CO_2/N_2$ Selectivity: 38

Example 22

To a rapidly stirred solution of 2,3,5,6-tetramethyl-1,4-phenylene diamine (32.86 g, 0.20 mol) in N-methyl pyrrolidone (500 ml) under an inert atmosphere at 50° C. was added 1,2,4,5-benzenetetracarboxylic dianhydride (8.73 g, 0.04 mol). To the resulting solution was portionwise added 4,4'-(hexafluoroisopropylidene)-bis(phthalic anhydride) (71.04 g, 0.16 mol, in 4 portions, last portion washed in with 250 ml N-methyl pyrrolidone). The reaction solution was allowed to stir at 50° C. overnight. A solution of acetic anhydride (75.8 ml, 0.80 mol) and triethylamine (112.9 ml, 0.81 mol) was added with rapid stirring and the viscous yellow solution was allowed to stir an additional 2 hours at 50° C. The polymer was precipitated in methanol, collected by filtration, washed with methanol, and air dried. The off-white polymer was further dried in a vacuum oven at room temperature overnight, at 100° C. for 3 hours, and at 250° C. for 4 hours to give 105 g product.

Example 23

Films of the polymer prepared in Example 22 were cast from a 10% polymer solution (based on weight) in N-methyl pyrrolidone onto a glass plate treated with Du Pont TEFLON ® dry lubricant at 80° C. with a 15 mil ($3.8 \times 10^{-5}$) knife gap. The films were dried on the plate at 80° C. for 25 minutes, cooled to room temperature, stripped off the plate and dried in a vacuum oven at room temperature overnight and at 120° C. for 4 hours. The films were then tested for mixed gas $O_2/N_2$ (21/79 mole) permeabilities at 300 psig ($20.7 \times 10^5$ Pa), 25° C. The results are reported below:
$O_2$ Productivity: 16,400 centiBarrer
$O_2/N_2$ Selectivity: 3.4 and
$O_2$ Productivity: 22,000 centiBarrer
$O_2/N_2$ Selectivity: 3.2

Example 24

Asymmetric membranes of Example 1 were cast from a 20% (weight) polymer solution in N,N-dimethyl formamide: formamide (95:5, weight) solution onto a glass plate at 50° C. with a 15-mil knife gap. The films were dried on the plate at 50° C. for 2 minutes and then precipitated in deionized water at 25° C. After the resulting white asymmetric membranes had sat in deionized water for 24 hours, they were placed in isopropanol. After sitting in isopropanol for 24 hours, the membranes were air dried. The asymmetric membranes were then tested for mixed gas $O_2/N_2$ (21/79) (mole) permeabilities at 300 psig ($20.7 \times 10^5$ Pa), 25° C. The results are reported below:
$O_2$ Productivity: 350 GPU
$O_2/N_2$ Selectivity: 3.3

$$GPU = 10^{-6} \times \frac{cm^3 \text{ (STP)}}{cm^2 \cdot sec \cdot (cm\ Hg)}$$

Example 25

Asymmetric membranes of Example 1 were cast from a 20% (weight) polymer solution in N,N-dimethyl formamide: water (97:3) solution (weight) onto a glass plate at 100° C. with a 15 mil knife gap. The films were dried on the plate at 100° C. for 10 seconds and then precipitated in deionized water at 25° C. After the resulting white asymmetric membranes had sat in deionized water for 24 hours, the membranes were placed in isopropanol for 24 hours. The membranes were air dried. The membranes were treated with a 0.25% (weight/volume) Dow Corning SYLGARD-184® solution in FREON-113 and dried in a vacuum oven at 50° C. for 24 hours. The asymmetric membranes were then tested for mixed gas $O_2/N_2$ (21/79) (mole) permeabilities at 300 psig ($20.7 \times 10^5$ Pa), 25° C. The results are reported below:

$O_2$ Producivity: 100 GPU
$O_2/N_2$ Selectivity: 4.0

The asymmetric membranes prepared above were consecutively tested for pure gas carbon dioxide and methane permeabilities at 100 psig, 25° C. The results are shown below:

$CO_2$ Productivity: 1000 GPU
$CH_4$ Productivity: 36 GPU
$CO_2/CH_4$ Selectivity: 28

I claim:

1. A gas separation membrane formed of an aromatic polyimide of the formula

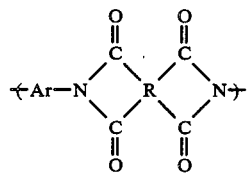

where —Ar— is

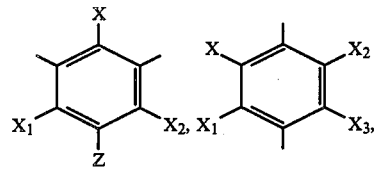

or mixture thereof, and R is

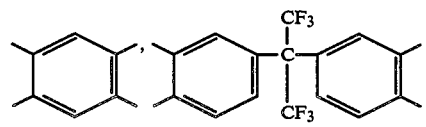

or mixtures thereof and —X, —$X_1$, —$X_2$, and —$X_3$ are independently alkyl groups having 1 to 6 carbon atoms or aromatic groups having 6 to 13 carbon atoms, and —Z is —H, —X, —$X_1$, —$X_2$, or —$X_3$.

2. The membrane of claim 1 wherein —X, —$X_1$, —$X_2$, or —$X_3$ are —$CH_3$ or —$C_2H_5$.

3. The membrane of claim 2 wherein R is

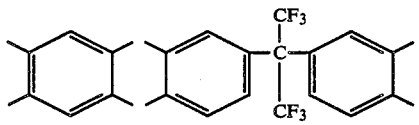

4. A process of separating two or more gases comprising of steps of bringing a mixture of two or more gases into contact with one side of a permselective membrane which is formed from an aromatic polyimide of the formula

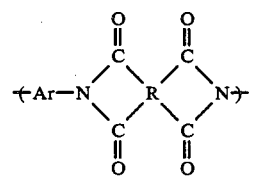

where —Ar— is

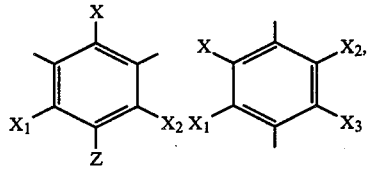

or
or mixtures thereof, and R' is

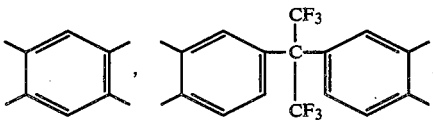

or mixtures thereof and —X, —$X_1$, —$X_2$, and —$X_3$ are independently alkyl groups of 1 to 6 carbon atoms, or aromatic group having 6 to 13 carbon atoms and —Z is —H, —X, —$X_1$, —$X_2$, or —$X_3$ whereby one of said gases permeates said membrane at a different productivity rate than at least one other gas.

5. The process of claim 4 wherein —X, —$X_1$, —$X_2$, —$X_3$ are —$CH_3$ or —$C_2H_5$.

6. The process of claim 5 wherein R is

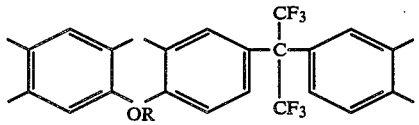

* * * * *